(12) United States Patent
Breton et al.

(10) Patent No.: US 8,037,204 B2
(45) Date of Patent: Oct. 11, 2011

(54) METHOD AND SYSTEM FOR IP TRAIN INAUGURATION

(75) Inventors: Luc Breton, Montreal-Nord (CA); Domenico Brunetti, Montreal (CA); Hugo J. W. Vliegen, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 1321 days.

(21) Appl. No.: 11/056,545

(22) Filed: Feb. 11, 2005

(65) Prior Publication Data
US 2006/0180709 A1    Aug. 17, 2006

(51) Int. Cl.
*G06F 15/173* (2006.01)
(52) U.S. Cl. ...................................................... 709/238
(58) Field of Classification Search .................... 709/238
See application file for complete search history.

(56) References Cited

U.S. PATENT DOCUMENTS

| | | | |
|---|---|---|---|
| 5,862,062 A * | 1/1999 | Smyrl et al. | 703/8 |
| 6,680,918 B1 * | 1/2004 | Haley | 370/282 |
| 7,073,753 B2 | 7/2006 | Root et al. | |
| 2003/0135644 A1 * | 7/2003 | Barrett | 709/238 |
| 2004/0028035 A1 * | 2/2004 | Read | 370/352 |
| 2004/0173674 A1 * | 9/2004 | Matsuura | 235/380 |
| 2005/0125112 A1 * | 6/2005 | LaDuc et al. | 701/19 |
| 2006/0168320 A1 * | 7/2006 | Kidd et al. | 709/238 |

OTHER PUBLICATIONS

"Understanding and Configuring CDP," Catalyst 4500 Series Switch CISCO IOS Software Configuration Guide 12.1 (19)EW, copyright 1992-2004, published Jul. 1, 2007.

* cited by examiner

*Primary Examiner* — John Follansbee
*Assistant Examiner* — Alan S Chou
(74) *Attorney, Agent, or Firm* — Stolowitz Ford Cowger LLP

(57) ABSTRACT

A method and system for train inauguration over an internet protocol (IP) based communication network. The present invention describes a method of train inauguration that includes identifying a leading car of a plurality of cars that form a train. The train includes at least one unit of cars such that a first unit includes the leading car. Network and configuration information is discovered for cars in the train using a discovery protocol. The network and configuration information is broadcast to units in the train. Car and unit topology of the train is generated based on the network and configuration information and the leading car that is identified. NAT translation addresses are generated for fixed IP addresses of devices in the plurality of cars. Routing information is exchanged between routers to enable communication between devices in the train using the NAT translation addresses.

24 Claims, 12 Drawing Sheets

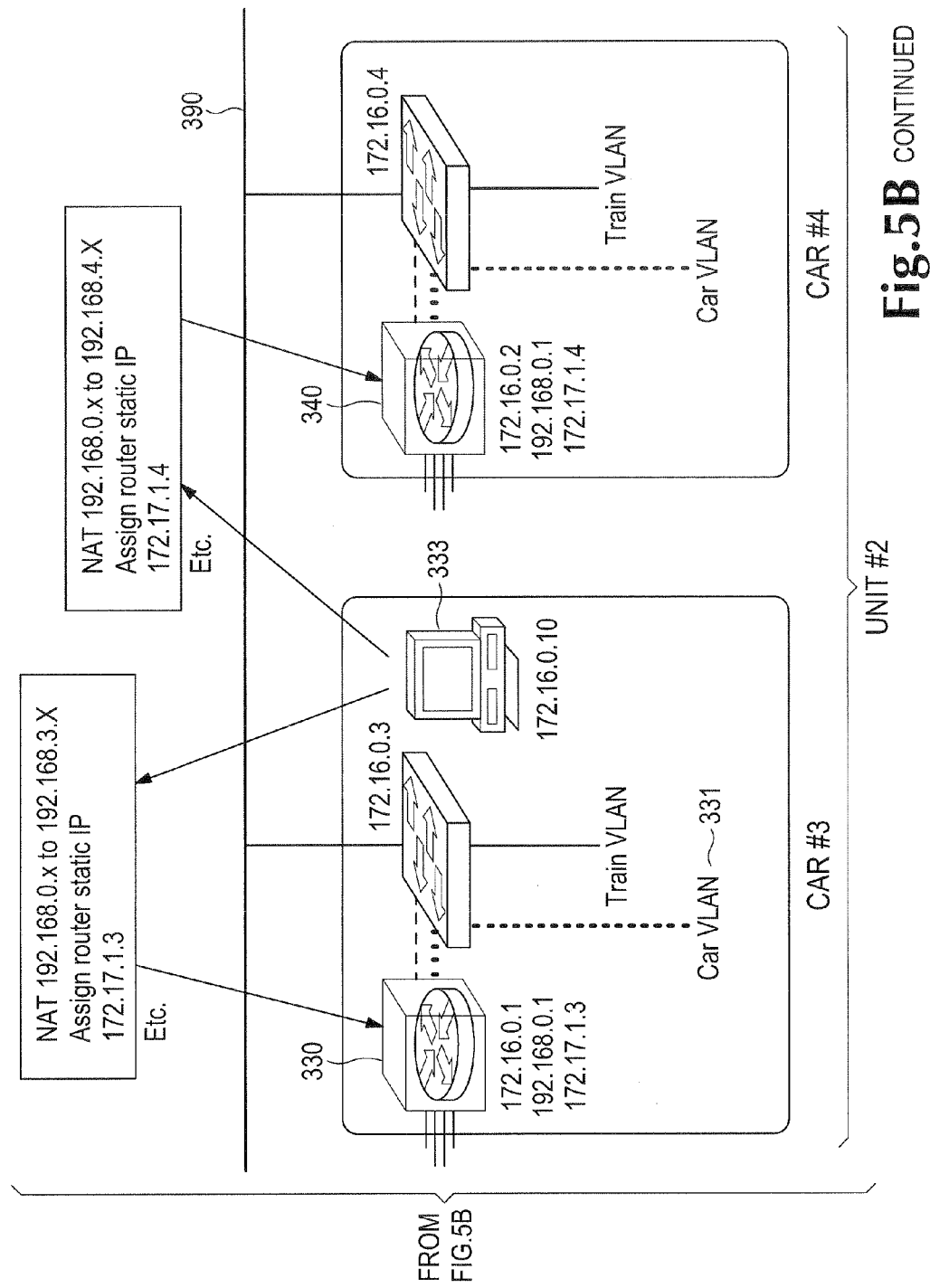

METHOD AND SYSTEM FOR IP TRAIN INAUGURATION

BACKGROUND OF THE INVENTION

1. Field of the Invention

Embodiments of the present invention relate to the field of internet protocol communication. More particularly, embodiments of the present invention relate generally to train inauguration over an internet protocol (IP) based communication network.

2. Related Art

Communication systems within a train can be used to perform various functions throughout the train. For instance, management of various control features of cars within the train is performed over a physical communication network throughout the train. As an example, door control on either side of the train can be managed over the communication network.

Train inauguration is necessary to provide a train topology of each of the cars and units of cars within the train. Multiple cars can be arranged into a unit of cars that are intended to remain as a unit. Communication within the unit can be implemented through a unit wide physical network. Multiple units can be coupled together through couplers. Communication between units is implemented through electrical connections at the couplers.

Before control over the train can be implemented, it is necessary to determine, as an example, the numbers of cars in the train, the orientation of each of the cars on the train, and the order of cars in the train. Once the topology features are determined, direct communication to targeted cars is enabled for proper implementation of control features. This allows for control of specific features on specific cars. For example, on a train-wide basis, a control signal can be sent to each of the cars to open or close its doors on the left side of the train. Control signals can also be sent to a subset of individual cars on the train.

In the conventional art, the Train Communication Network (TCN) protocol is used for train inauguration. TCN is a standard for providing compatibility between cars manufactured by different companies to include communication through the physical network on a train. The TCN is a bus based technology that operates at 1 mega bits per second (Mbps). However, TCN is not easily scaleable. As more and more feature capabilities are added to a train, additional wires are needed to service the feature capabilities. That is, dedicated physical networks are provided for each feature. However, the connections at the couplers are limited. As such, TCN can only adequately service up to a particular number of cars during the inauguration process.

DETAILED DESCRIPTION OF THE INVENTION

Reference will now be made in detail to the preferred embodiments of the present invention, a method and system of train inauguration over an IP based communication network, examples of which are illustrated in the accompanying drawings.

Accordingly, various embodiments of the present invention disclose a method and system for train inauguration over an Internet Protocol (IP) based communication network. Embodiments of the present invention provide for a single IP network communicatively coupling standard IP devices located throughout a train, instead of having many different physical networks inside the train controlling different control features. The IP network supports train inauguration and is compatible with legacy equipment coupled to the IP network through gateways.

Notation and Nomenclature

Figure 1:
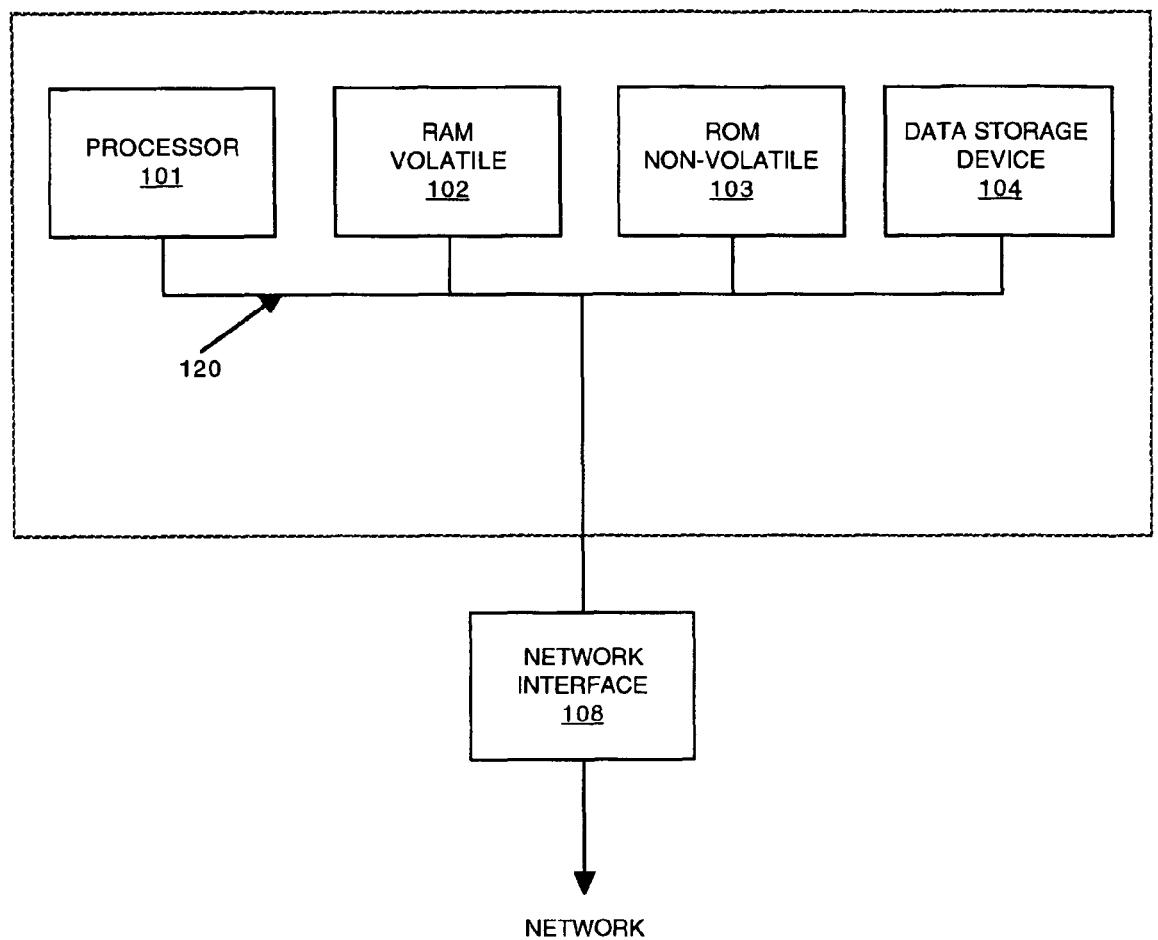
FIG. 1 is a block diagram of an electronic device that is capable of train inauguration over an IP based communication network, in accordance with one embodiment of the present invention.

Referring now to FIG. 1, portions of the present invention are comprised of computer-readable and computer-executable instructions which reside, for example, in computer-readable media of an electronic system, such as, a vehicle control unit, personal computer, cell phone, personal digital assistant, server computer, mainframe, networked computer, workstation, router, and the like. FIG. 1 is a block diagram of interior components of an exemplary electronic system 100, upon which embodiments of the present invention may be implemented.

Exemplary electronic system 100 includes an address/data bus 120 for communicating information, a central processor 101 coupled with the bus 120 for processing information and instructions, a volatile memory 102 (e.g., random access memory (RAM), static RAM dynamic RAM, etc.) coupled with the bus 120 for storing information and instructions for the central processor 101, and a non-volatile memory 103 (e.g., read only memory (ROM), programmable ROM, flash memory, EPROM, EEPROM, etc.) coupled to the bus 120 for storing static information and instructions for the processor 101.

Exemplary electronic system 100 also includes an optional data storage device 104 (e.g., memory card, hard drive, etc.) coupled with the bus 120 for storing information and instructions. Data storage device 104 can be removable. With reference still to FIG. 1, a network interface 108 (e.g., signal input/output device) is provided which is coupled to bus 120 for providing a communication link between electronic system 100 and a network environment, such as, an IP network environment. As such network interface 108 enables the central processor unit 101 to communicate with or monitor other electronic systems that are coupled to a communication network.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "identifying," "discovering," "broadcasting," "generating," and "exchanging," or the like, refer to the actions and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Method and System for IP Based Train Inauguration

Embodiments of the present describe a process for performing train inauguration when connecting cars or units of cars together using IP based technology. Train inauguration is necessary to generate a train topology of cars and their orientation within a train to properly manage control systems (e.g., door controllers, lights, climate controllers, etc) throughout the train, for example.

Figure 2:
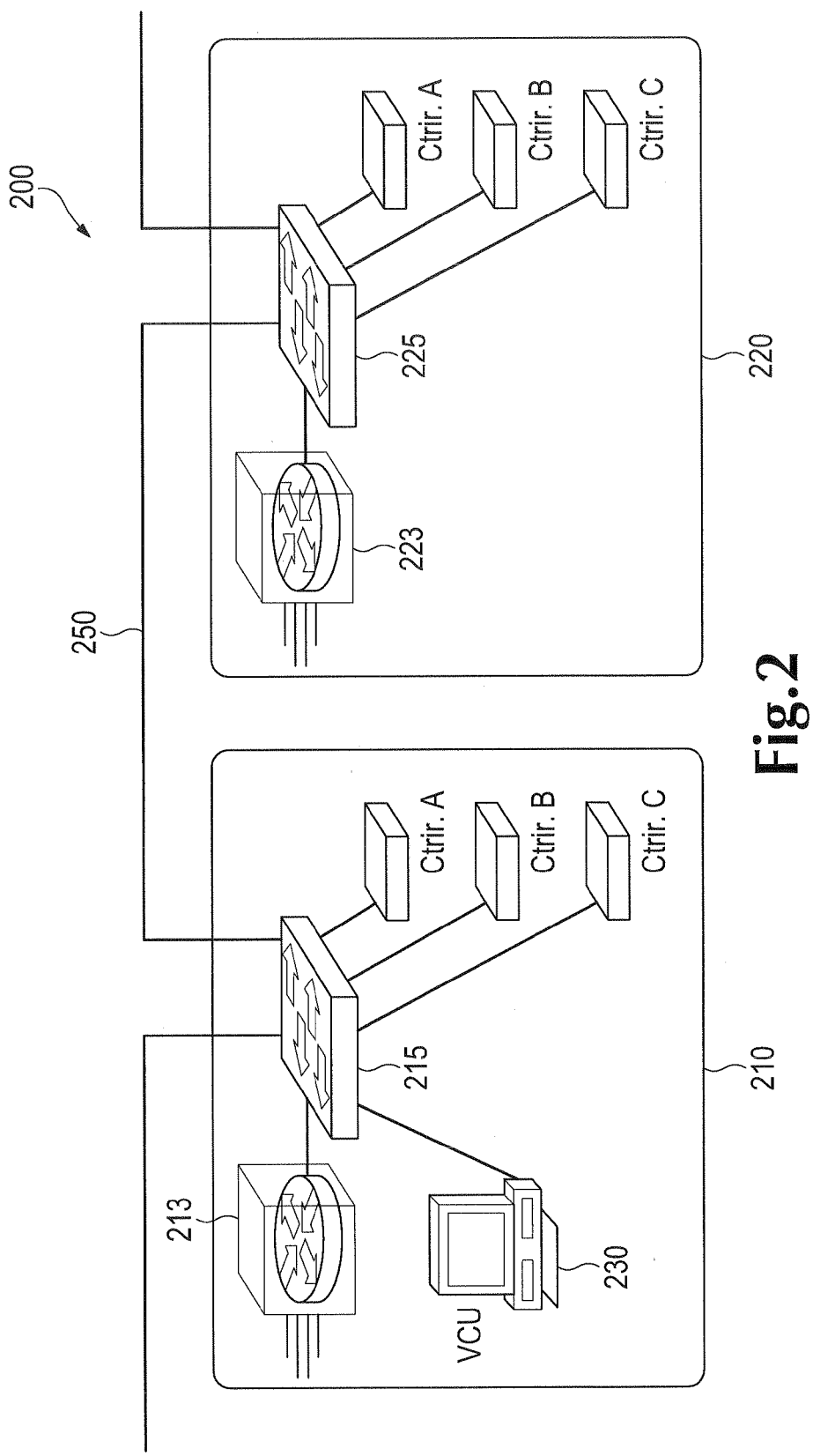
FIG. 2 is a diagram illustrating a physical communication network for a car and a unit of cars that is used for train inauguration over an IP based communication network, in accordance with one embodiment of the present invention.

FIG. 2 is a diagram illustrating a physical communication network in a unit 200 of cars within a train over which train inauguration is performed, in accordance with one embodiment of the present invention. Additionally, the diagram illustrates the physical communication network within a car in the train.

The unit 200 includes one or more standalone cars that are permanently linked together. For example, the unit 200 includes car 210 and car 220. In some cases, as many as 7 cars can be bolted together to form a unit. Units can be coupled together through train couplers with other units to form a train.

A physical communication network 250 is shown in FIG. 2. The communication network 250 enables wired communication between devices both within a particular car and between two different cars. For example, car 220 illustrates the basic physical setup for every car within the train. As shown, each car is equipped with at least one router 223 and a switch 225. Additional routers and switches can be used for redundancy. The car 210 also exhibits the basic setup with a router 213 and a switch 215.

In addition, each unit includes at least one vehicle control unit (VCU). For example, the unit 200 includes VCU 230. Additional VCUs can be included for redundancy. The VCU 230, in some embodiments is provided by the manufacturer of the car, and is used to manage control features within the cars of a unit. For example, in both cars 210 and 220, controller A may be a brake controller, controller B may be a door controller, and controller C may be a light controller. Controllers A, B, and C are managed by the VCU 230. In addition, the VCU 230 implements train inauguration over the IP based communication network of embodiments of the present invention.

As shown in FIG. 2, the communication network 250 is used to converge multiple virtual local area networks (VLANs). That is, a single converged Ethernet/IP network supports multiple virtual networks for train inauguration and communication between standard Ethernet/IP devices.

Figure 3:
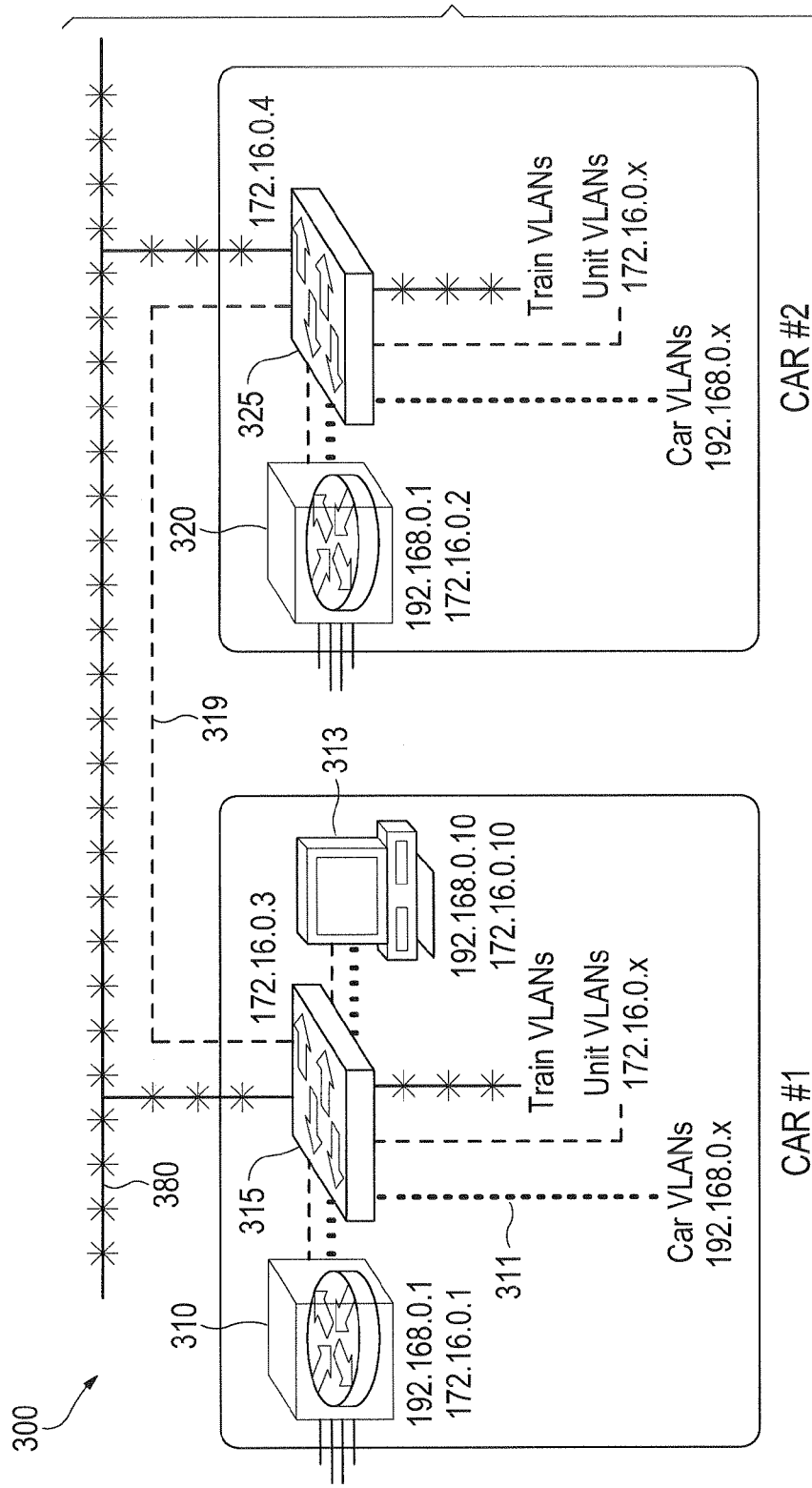
FIG. 3 is a diagram illustrating a logical communication network for a train over the physical communication network of FIG. 2 that is used for train inauguration over an IP based communication network, in accordance with one embodiment of the present invention.
Figure 3:
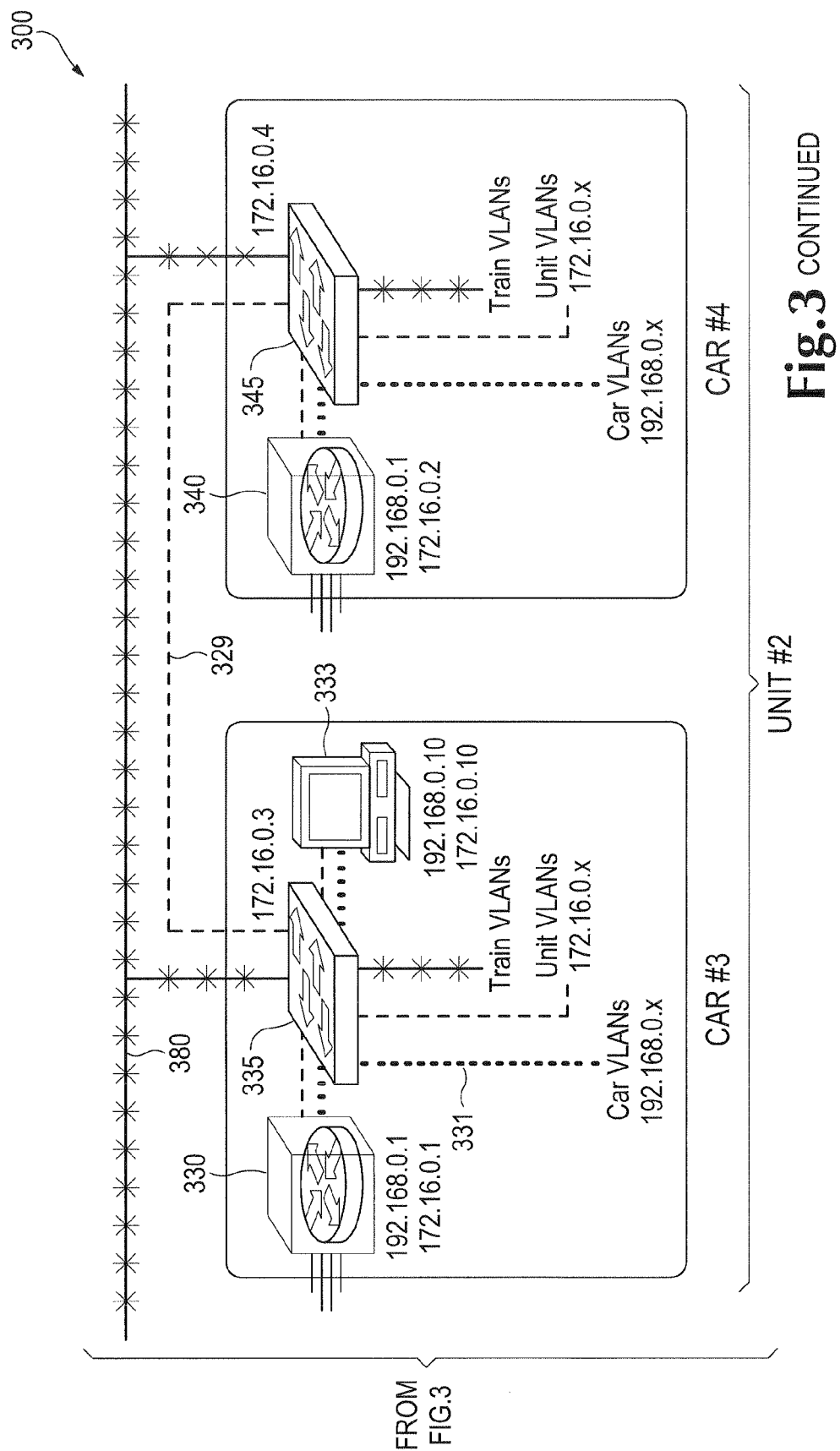

FIG. 3 is a diagram illustrating a logical communication network 300 that is implemented on the physical communication network 250 of FIG. 2, in accordance with one embodiment of the present invention. The logical communication network is used for train inauguration and communication between devices within a car and between cars on the train.

FIG. 3 shows four cars of a train and is used for illustration purposes only. In FIG. 3, the train includes car 1, car 2, car 3, and car 4. The train could include more or fewer cars. In FIG. 3, the train includes two units of cars, although more or fewer units of cars may be included. Unit 1 includes car 1 and car 2. Unit 2 includes car 3 and car 4.

The logical communication network 300 includes three virtual local area networks (VLANs). The VLANs enable the grouping of devices and their functions in a logical fashion rather than by physical location. As a result, each of the switches on the train can support multiple subnets (e.g., VLANs). This gives the routers and switches in the train of FIG. 3 the capability to support multiple subnets on a single physical link. As a result, a group of devices that are part of the same VLAN but located in different LAN segments (e.g., different cars of the train) can communicate as if they were part of the same LAN segment.

As shown in FIG. 3, the communication network 300 includes a train VLAN, a unit VLAN, and a car VLAN. Each of the VCUs in the train are coupled to their respective train VLAN, unit VLANs, and car VLANs through a trunk port using the IEEE 802.1Q standard, or its derivatives. While the present embodiment shows three types of VLANs, other embodiments are well suited to multiple VLANs of each of the types. Communication over the VLANs is enabled using an IP protocol. While the present embodiment of the present invention is described using an Ethernet based IP protocol (e.g., FastEthernet technology), other embodiments are well suited to other IP based protocols.

The car VLAN is used for communication between devices in a particular car. That is, every car has a separate car VLAN, and as such the same subnet (192.168.0.x/24) can be reused for every car. For example, the dotted line in car 1 represents the car VLAN 311 and is implemented only within car 1. Similarly dotted lines in each of the cars 2-4 represent car VLANs that are restricted to within those cars. For example, the dotted line in car 3 represents the car VLAN 331 and is implemented within car 3.

As shown in FIG. 3, IP addresses for devices over the car VLAN follow the following format, as an example 192.168.0.x. By using this convention, IP addresses can be fixed within the car for devices using the car VLAN. That is IP addresses can be reused for the same device in every car. As an example, routers in each of the cars 1-4 have a similar IP address of 192.168.0.1 that is used within their respective car VLANs. For instance, router 310 in car 1 has an IP address of 192.168.0.1. In addition, router 330 in car 3 has a similar IP address of 192.168.0.1. Also, VCUs 313 and 333 have similar IP addresses of 192.168.0.10. The same IP address can be used since there is no overlap of IP addresses within a particular car VLAN.

The unit VLAN is used for communication between devices between cars of a particular unit. That is, every unit has a separate unit VLAN, and as such the same subnetwork (172.16.0.x/24) can be reused for every unit. For example, the dashed lines in unit 1 represents the unit VLAN 319 and is implemented only within unit 1. Similarly the dashed lines in unit 2 represents the unit VLAN 329 and is implemented only within unit 2.

As shown in FIG. 3, IP addresses for devices over the unit VLAN follow the following format, as an example 172.16.0.x. By using this convention, IP addresses can be fixed within the unit for devices using the unit VLAN. That is IP addresses can be reused for devices in every unit. As an example, in unit 1, router 310 has an IP address of 172.16.0.1, router 320 has an IP address of 172.16.0.2, switch 315 has an IP address of 172.16.0.3, switch 325 has an IP address of 172.16.0.4, and VCU 313 has an IP address of address of 172.16.0.10. Similarly, in car 2, the IP addresses are reused. That is, in unit 2, over the subnetwork 172.16.0x/24, dispensing with the prefix, the router 330 has an IP address of 0.1, router 340 has an IP address of 0.2, switch 335 has an IP address of 0.3, switch 345 has an IP address of 0.4, and VCU 333 has an IP address of address of 0.10.

The train VLAN 380 as shown by the line with asterisk is used for communication between devices between cars of a train. In particular, the train VLAN 380 couples devices from different units. Typically, the VCUs throughout the train communicate through the train VLAN 380 through broadcasting. That is, the train has a network that broadcasts messages to devices throughout the train that are coupled to the train VLAN 380. As such, the train VLAN 380 is not associated with IP addresses.

In one embodiment, each of the switches 315, 325, 335, and 345 connects the devices within a car over the car VLAN subnetwork. In addition, the switches connect devices between cars of a unit over the unit VLAN subnetwork. The switches move frames of data from one port to another port through the car and unit VLANs.

In one embodiment, each of the routers 310, 320, 330, and 340 is a mobile access router. The mobile access router enables both wireless communication to external communication networks outside of the train, as well as enabling communication between the VLANs within the train using a network address translation (NAT) table, as will be described in full below in FIG. 4. In general, the routers of FIG. 3 forward traffic to other routers based on the IP addresses as translated by the NAT table.

Figure 4:
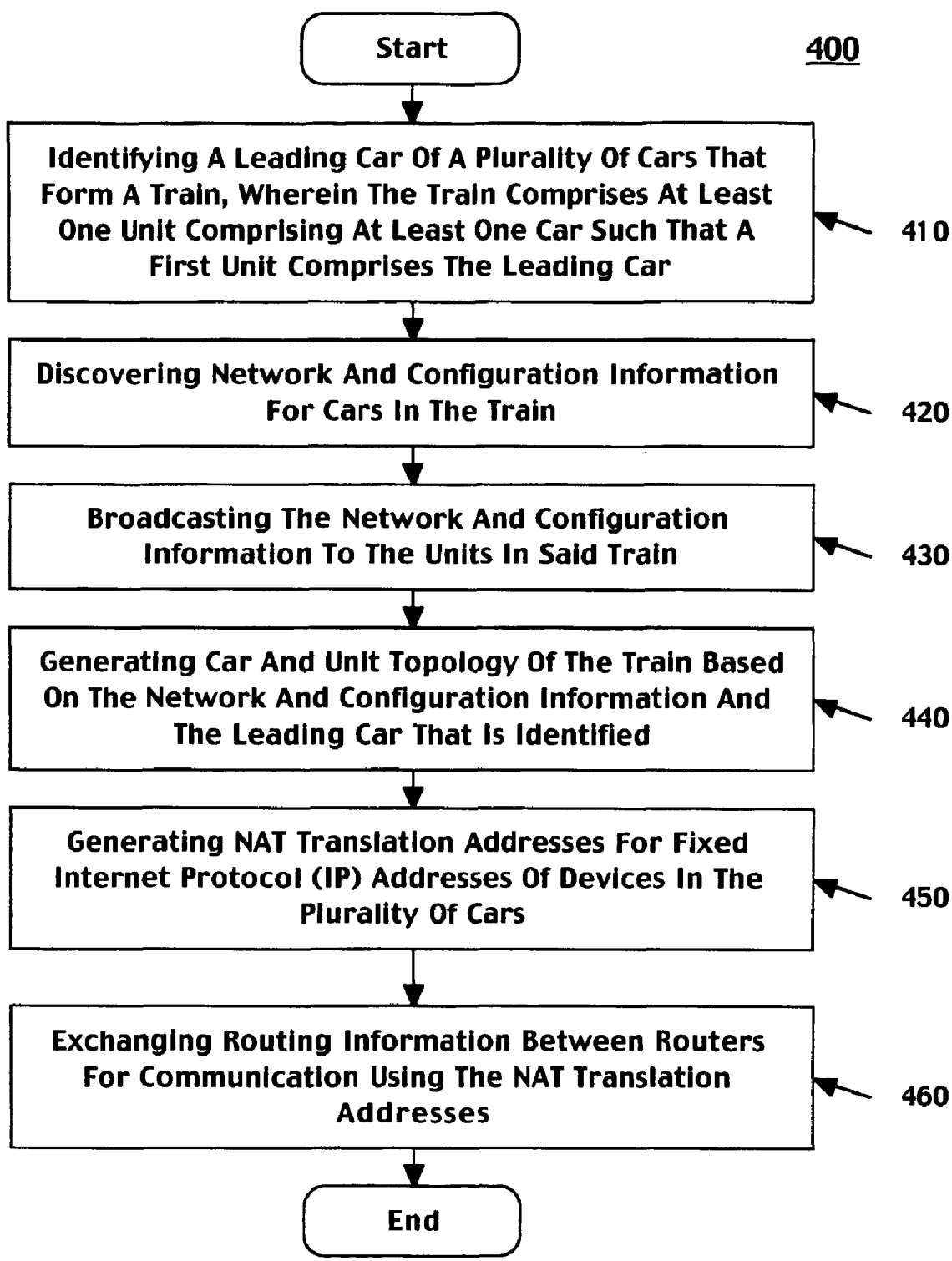
FIG. 4 is a flow diagram illustrating steps in a computer implemented method for train inauguration over an IP based communication network, in accordance with one embodiment of the present invention.
Figure 5A:
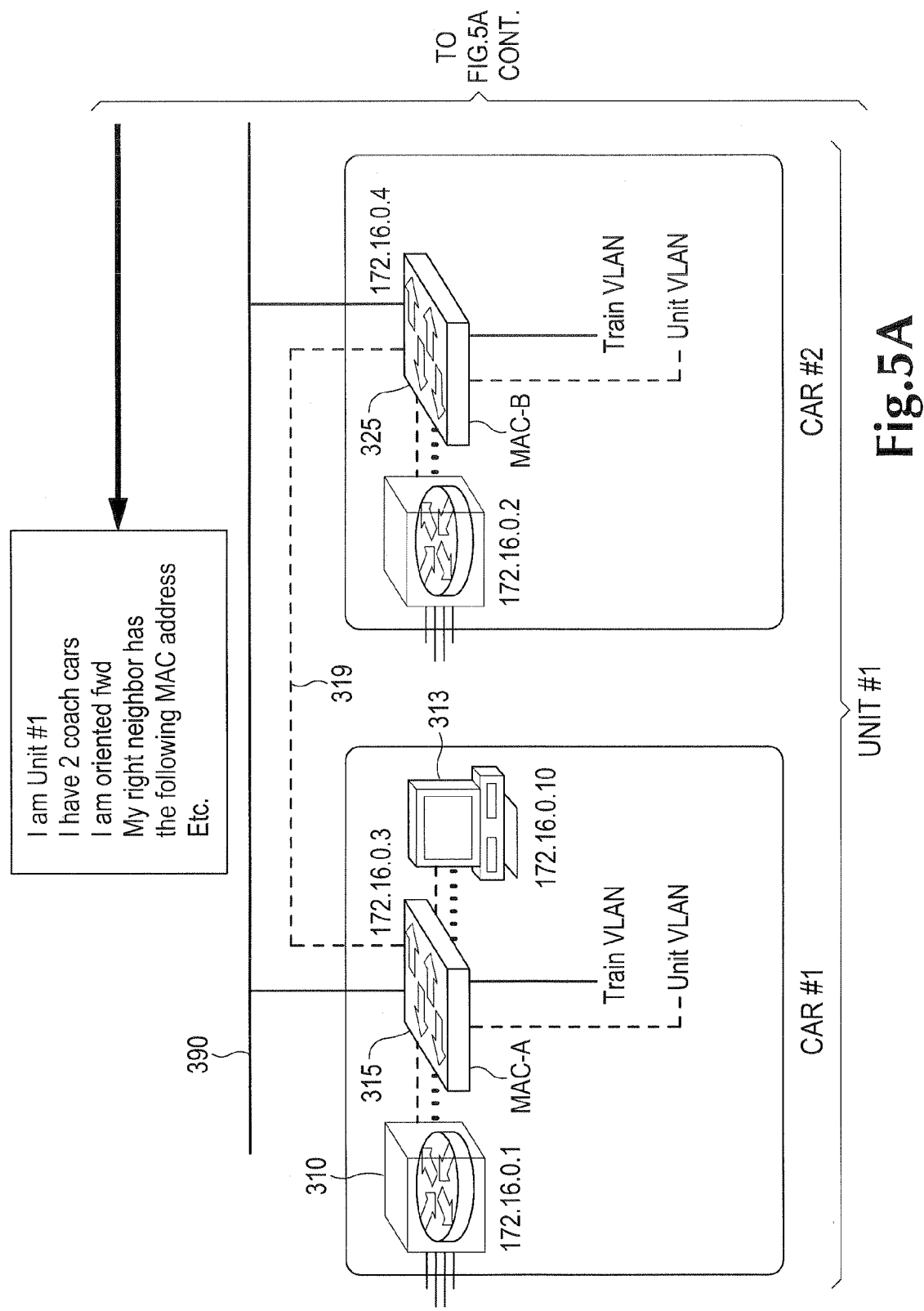
FIG. 5A is a diagram illustrating the generation of car and unit topology of a train during a train inauguration process, in accordance with one embodiment of the present invention.
Figure 5A:
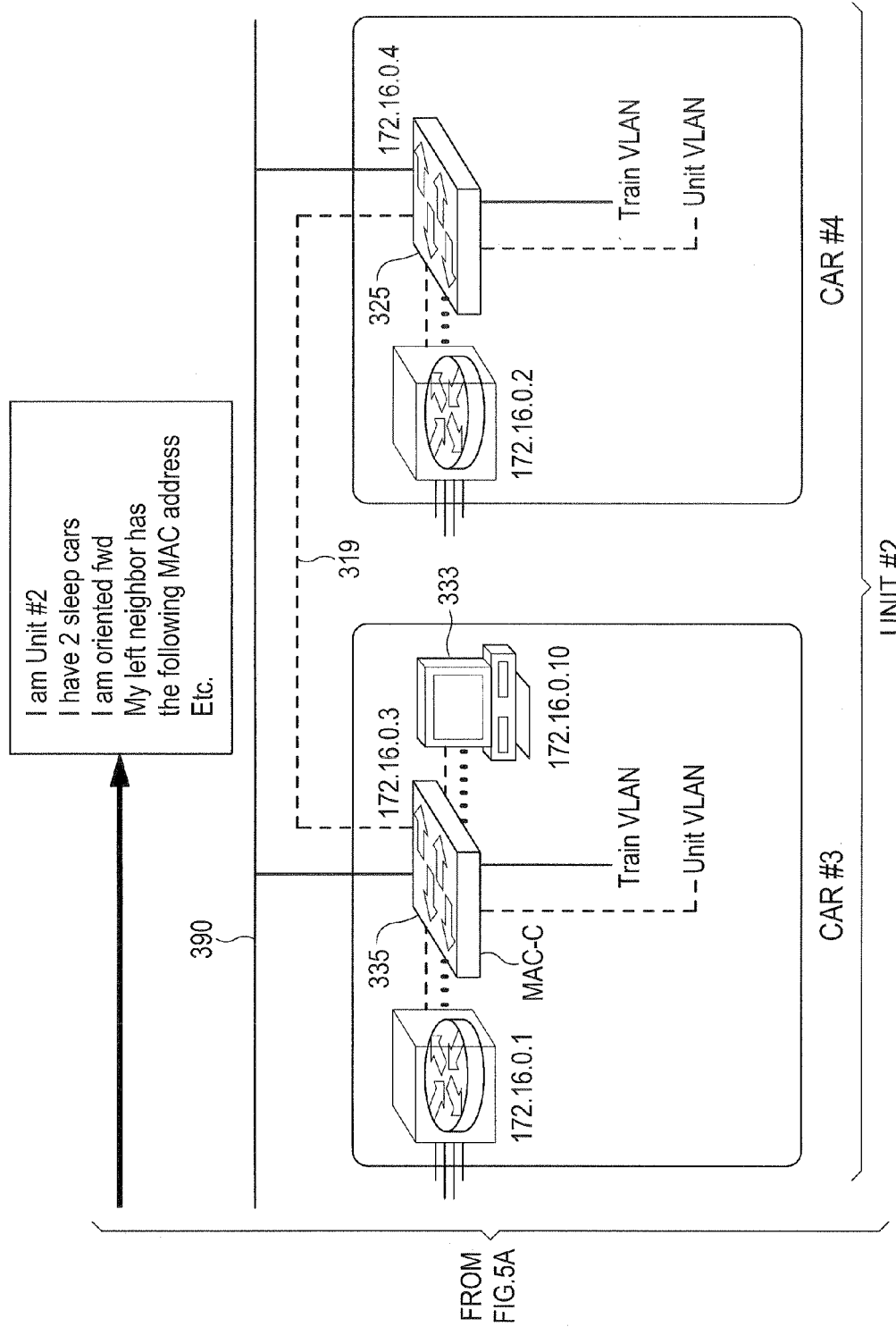
Figure 5B:
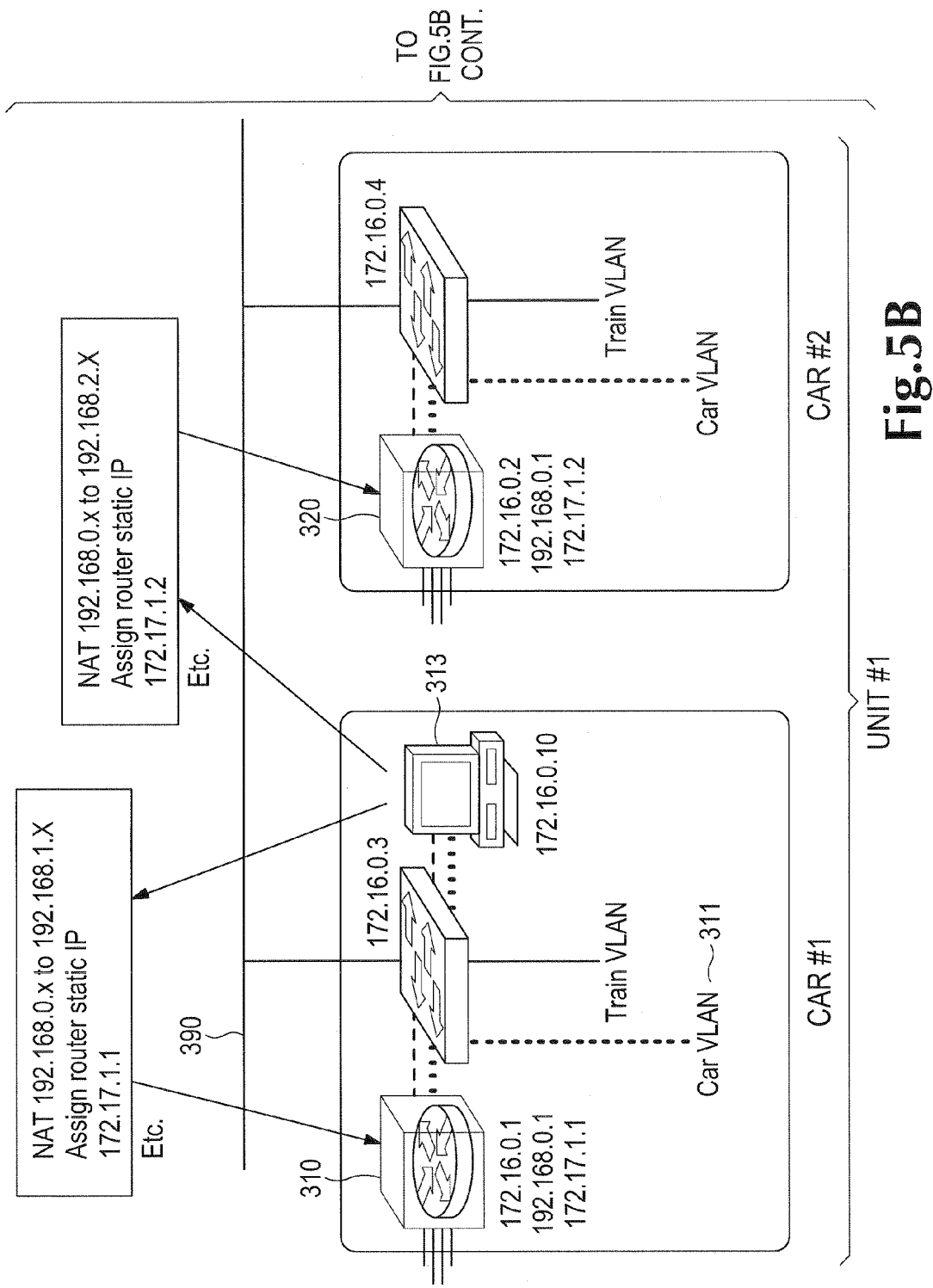
FIG. 5B is a diagram illustrating the generation and assignment of NAT translation addresses for fixed IP addresses of devices in the cars of a train during a train inauguration process, in accordance with one embodiment of the present invention.
Figure 5C:
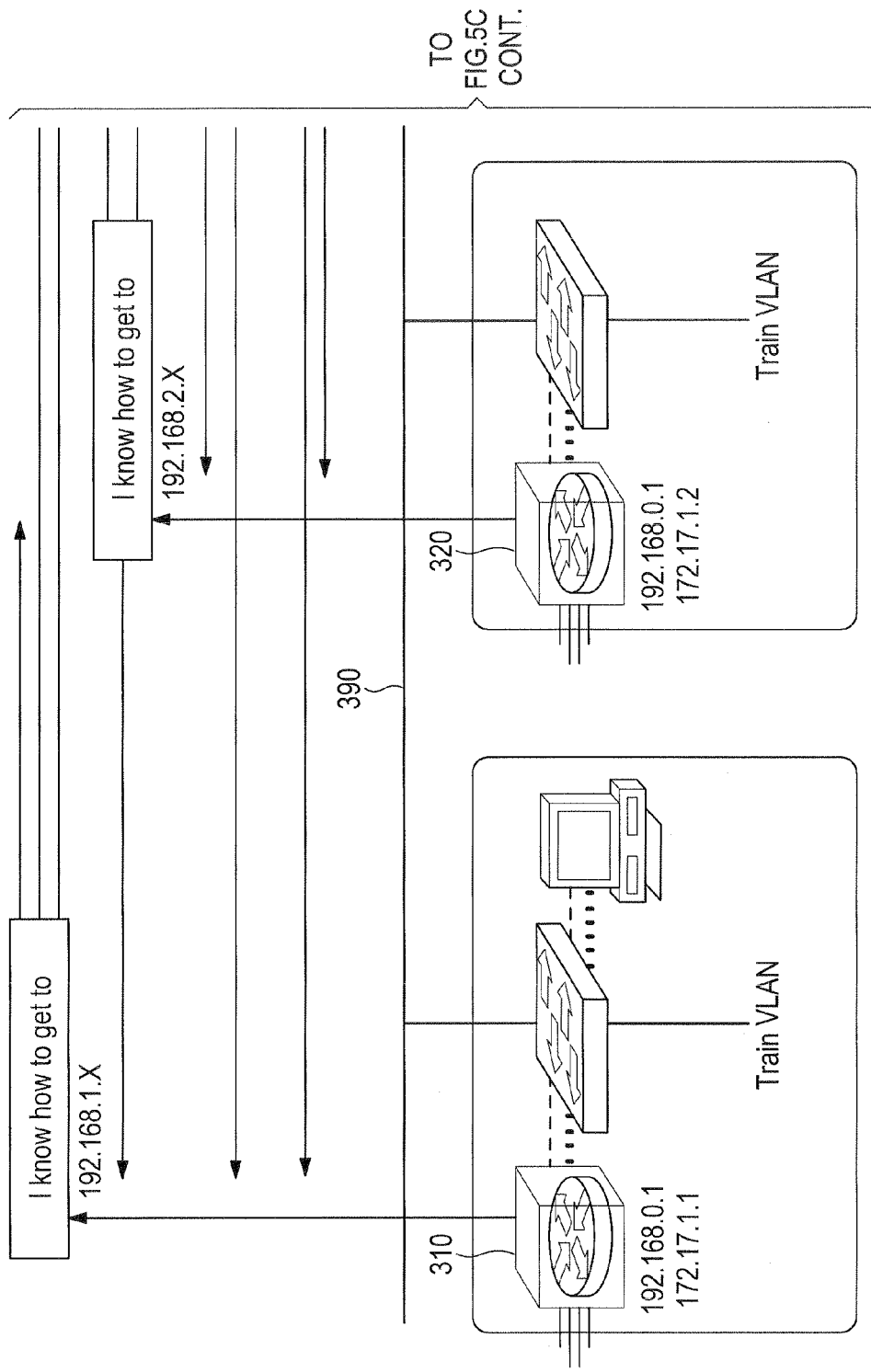
FIG. 5C is a diagram illustrating the exchange of routing information between routers for communication using the NAT translation addresses during a train inauguration process, in accordance with one embodiment of the present invention.
Figure 5C:
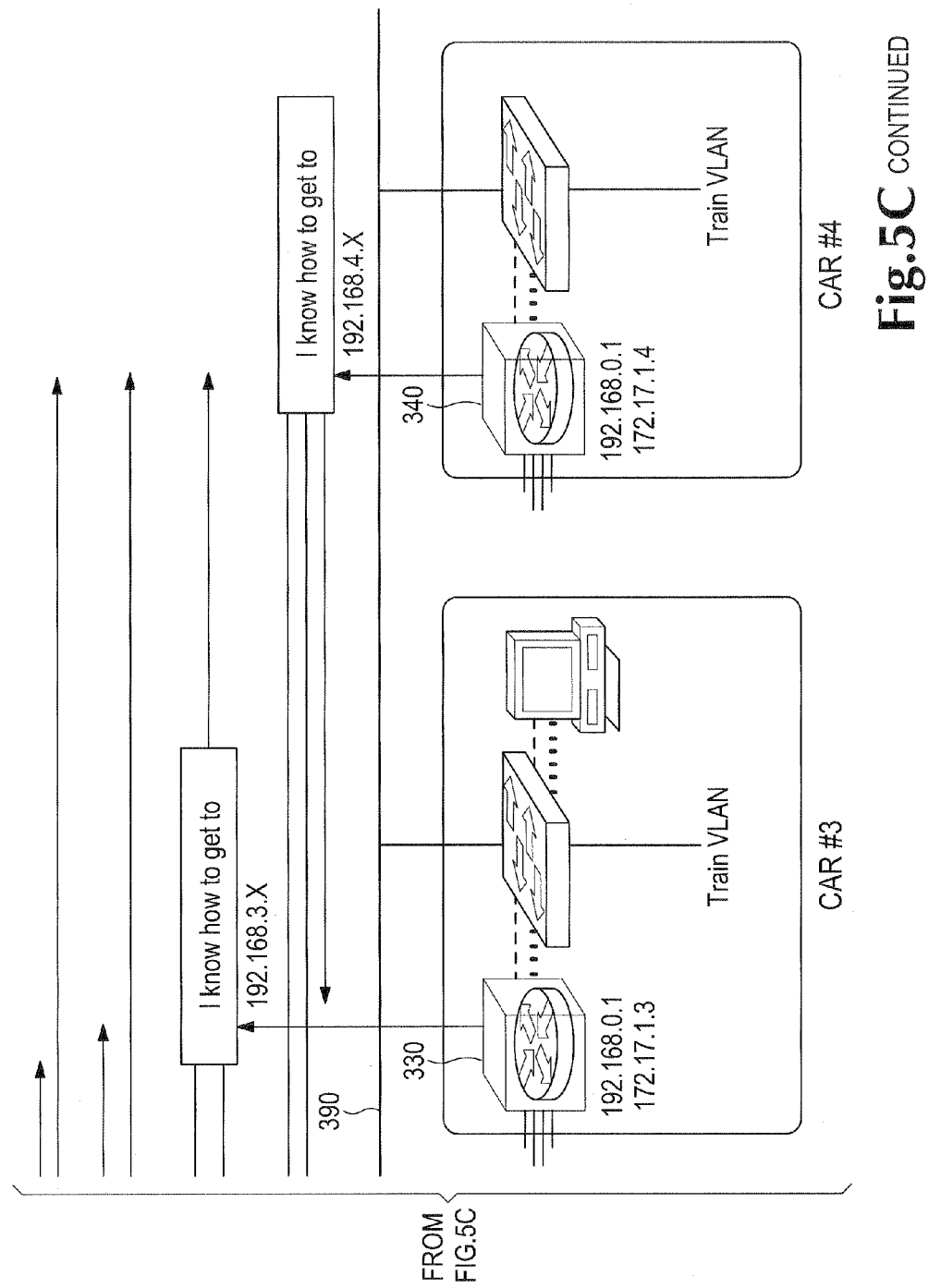

FIG. 4 in combination with FIGS. 5A-C illustrate the process of train inauguration over an IP network. In particular, FIG. 4 is a flow diagram 400 illustrating steps in a computer implemented method for train inauguration over an IP based communication network, in accordance with one embodiment of the present invention. FIGS. 5A-C illustrate particular processes as outlined in flow diagram 400. The structure of the devices in the train in FIGS. 5A-C are similar to the structure of devices in the train of FIG. 3. Similarly numbered devices refer to the same device.

Turning now to FIG. 4, the method as disclosed in FIG. 4 is implemented using an Ethernet IP communication protocol (e.g., 802.3ad) for train inauguration and communication within a train. As previously discussed, other embodiments are well suited to other IP communication protocols.

At 410, the present embodiment identifies a leading car of a train. The train includes a plurality of cars that are linked together. Cars within units are permanently linked together. Units of cars are coupled together to form the train. As such, the train includes at least one unit, and at least one unit of a train includes the leading car.

In one embodiment, the leading car is identified by turning on the leading car. That is, power is applied to the leading car. Various means are provided for identifying the leading car of a train, and are typically provided for by the manufacturer of the cars of the train.

The leading car is identified in order to provide a start to the train topology. In this way, the VCU in the unit that includes the leading car recognizes that a car in its unit is the leading car, and can determine the leading car's orientation along a particular track that the train is traveling on, for example. For example, in FIG. 5A, the leading car may be identified as car 1, unit 1.

At 420, the present embodiment discovers network and configuration information for cars in the train. More specifically, the present embodiment implements a discovery protocol to discover the network and configuration information for devices and cars in the train. For example, the discovery protocol can be a CISCO™ discovery protocol, in one embodiment. The discovery protocol can be used by the VCUs and devices within a car of a train to discover and learn information about one another. The discovery protocol can be used to advertise the existence of a device to neighbors on a VLAN. In general, the discovery protocol can be used as a show configuration command for routers, switches and other devices on various VLANs.

One implementation of the CISCO™ discovery protocol (CDP) is described in "Understanding and Configuring CDP," Catalyst 4500 Series Switch CISCO IOS Software Configuration Guide 12.1(19)EW, copyright 1992-2004, the disclosure of which is hereby incorporated herein by reference as background material.

In the present embodiment, the discovery protocol is used by a VCU in a unit to discover the cars of the unit, the orientation of the cars of the unit, and various other network and configuration information pertaining to those cars. That is, the VCU can query each of the devices in the cars of its associated unit for network and configuration information. Each of the devices (e.g., routers, switches, etc) in the unit can also automatically send network and configuration information back to the VCU.

Orientation of a particular car can be determined from the communication ports used in coupling that car to a neighbor car. With reference to the leading car and its orientation along a particular track, the orientation of successive cars is determined by the communication port used. For example, if the front of the car has port 1, and the rear of the car has port 2, the orientation of the car can be determined in relation to its neighbor car by determining which communication port is used to couple to neighboring cars. Beginning from the orientation of the leading car, the orientation of the remaining cars in relation to the leading car can also be determined.

Within a unit, the network information includes, but is not limited to, unique Media Access Control (MAC) addresses of the devices, the association of the devices within a VLAN network, IP addresses, etc. Each device is associated with a unique MAC address that is typically set by the manufacturer.

Configuration information includes the orientation of cars, the type of car (e.g., coach, sleeper, engine, etc.), etc. As a result, a VCU in a unit is able to determine all of the network and configuration information for that unit.

For example, in FIG. 5A, the VCU 313 can determine the network and configuration information for devices in unit 1. As such, the VCU 313 determines that 2 cars (car 1 and car 2) are in unit 1. The VCU 313 can assign IP addresses for the devices for use in the unit VLAN, as well as for the car VLAN if necessary to avoid overlapping IP addresses. That is, the VCU can provide network address translation for IP addresses at the unit level. As a result, over the unit VLAN 319 in unit 1, using the subnetwork 172.16.0.x/24, the router 310 has an IP address of 0.1, and switch 325 has an IP address of 0.4, etc. as previously described.

In addition, over the unit VLAN 319, the VCU in a particular unit is able to discover network and configuration information of neighboring cars both within its respective unit and for cars in neighboring units. In this manner, the order of the cars within a unit, the order of cars between units, and the order of cars throughout the train can be determined.

For example, returning to FIG. 5A, the VCU 313 can discover neighbor information within the unit 1 to determine the order of car 1 and car 2. Through the discovery process, the VCU 313 can determine that car 1 is associated with a switch 315 with MAC address A (MAC-A). In addition, the VCU can determine that car 2 is associated with switch 325 with MAC address B (MAC-B). By querying its neighbors, the switch 315 can determine that a neighbor switch has the MAC address MAC-B. As a result, the VCU understands that car 1 is first and car 2 is second in the unit, after determining that car 1 is closest to the leading car of the train.

The same process can be used to determine the order of neighboring cars in neighboring units. For example, in FIG. 5A, car 2 is associated with unit 1 and car 3 is associated with unit 2. Each of the VCUs can query next unit information through the discovery process using their respective management VLANs (e.g., the unit VLANs). As such, the VCU 313 should discover that the neighbor to car 2 has a switch 335 with MAC address MAC-C, for example.

In one embodiment, each of the VCUs 313 and 333 are informed of the existence of the neighbor through a simple network management protocol (SNMP) trap. That is, upon linking to a train, the new unit can send an SNMP trap to other VCUs that they have linked to the train.

Returning to FIG. 4, at 430, the present embodiment broadcasts the network and configuration information to other units in the train. More specifically, the present embodiment broadcasts the information over the train VLAN to all the other VCUs in the train. In one embodiment, the broadcast message is over a layer 2 Open Systems Interconnection [OSI] protocol). For example, returning to FIG. 5A, VCU 313 can broadcast a message that indicates for unit 1, there are two coach cars, the cars are oriented forward so that car 1 is closer to the leading car of the train, as well as additional relevant network and configuration information. In addition, the VCU 313 provides neighboring information. For example, the VCU 313 will broadcast that the neighbor to its rear has a switch with MAC address MAC-C (switch 335).

Similarly, the VCU 333 can broadcast a message that indicates for unit 2, that there are two sleep cars, that the cars are oriented forward so that car 3 is closer to the leading car of the train, as well as additional relevant network and configuration information. In addition, the VCU 333 provides neighboring information. For example, the VCU 333 will broadcast that the neighbor to its front has a switch with MAC address MAC-B (switch 325).

At 440, the present embodiment generates car and unit topology of the entire train based on the network and configuration information that is broadcasted. In addition, the topology is based on the start point of the leading car that is identified, and its orientation along the track that the train is traveling. More specifically, each of the VCUs in the train separately generate the car and unit topology.

The order of the cars within units has already been determined by the VCUs in the respective units. In one embodiment, the order of cars between units, as well as the order of units is determined by matching MAC addresses of a single device that is known both to be a part of a particular unit and to be identified as part of a neighboring unit. That is, the MAC address of a device (e.g., a switch) associated with a first car is matched through discovery as the same MAC address of a neighboring device of a neighbor car to the first car. In that way, the first car and the neighbor car are linked. For example, returning to FIG. 5A, the MAC address MAC-C of the switch 335 is known to be a part of unit 2, car 3. In addition, through the discovery process, VCU 313 of unit 1 discovers that the MAC address MAC-C belongs to the neighbor car (car 3) of unit 2. In that way, car 2, unit 1 is linked to car 3, unit 2.

At 450, the present embodiment generates NAT translation addresses for fixed internet protocol (IP) addresses of devices in the plurality of cars of the train. That is, since each VCU knows which cars it controls, the particular routers and switches in those cars, and the car and unit topology of the train, a NAT translation table can be generated.

First, each VCU assigns proper static IP addresses to the routers in the train for router communication in a train wide VLAN (e.g., 390 of FIG. 5A). That is, each of the routers is assigned a unique static IP addresses for communication over the train VLAN 390. In one embodiment, this train VLAN 390 is different from train VLAN 380 that is used for broadcasting messages. As such, the train VLAN 390 allows the routers in each of the cars of the train to communicate with each other.

Second, each VCU instructs respective routers in their associated units to prepare a NAT table of NAT translation addresses for each router. The NAT table enables communication between devices both on a car subnetwork VLAN and the train subnetwork VLAN. New NAT translation addresses are created for each car subnet (car VLANs) and each unit subnet (unit VLANs) since the same IP addresses are re-used. In this way, no overlapping of addresses will occur once the NAT translation is performed. The NAT translation is performed by the routers, however the VCUs provide the necessary instructions and information on how to perform the NAT translation. As such, the NAT table that is created translates IP addresses for the devices on a car and unit VLAN levels to unique IP addresses on a train wide VLAN.

For example, the train subnetwork VLAN 390 can be 172.17.1.x. As shown in FIG. 5B, each of the VCUs can assign a static IP addresses to be used over the subnetwork 172.17.1.x. That is, router 310 can be assigned a static IP address of 172.17.1.1, router 320 can be assigned a static IP address of 172.17.1.2, router 330 can be assigned a static IP address of 172.17.1.3, and router 340 can be assigned a static IP address of 172.17.1.4 to be used over the train VLAN 390.

Then, as shown in FIG. 5B, each of the routers as instructed by their respective VCUs generate the respective NAT translation addresses for the devices in each of the cars. As a result, IP addresses that are NAT translated are used for communication between devices in separate cars over a train-wide Ethernet VLAN network 390, associated unit VLAN Ethernet networks, and associated car VLAN Ethernet networks.

Table 1 provides the NAT translation addresses for the routers and VCUs in the train illustrated in FIG. 5B. For purposes of clarity, the NAT translation for the unit VLANs is not provided. In addition, it is important to note that embodiments of the present invention are well suited to supporting multiple car VLANs (subnets), multiple unit VLANs (subnets), and multiple train VLANs (subnets).

TABLE 1

NAT Translation Addresses

| Device | Train VLAN IP Address | Car VLAN IP Address | NAT Address |
|---|---|---|---|
| Router 310 | 172.17.1.1 | 192.168.0.1 | 192.168.1.1 |
| Router 320 | 172.17.1.2 | 192.168.0.1 | 192.168.2.1 |
| Router 330 | 172.17.1.3 | 192.168.0.1 | 192.168.3.1 |
| Router 340 | 172.17.1.4 | 192.168.0.1 | 192.168.4.1 |
| VCU 313 | — | 192.168.0.10 | 192.168.1.10 |
| VCU 333 | — | 192.168.0.10 | 192.168.3.10 |

For instance, for router 310, the IP address for the external train VLAN has been NAT translated from 192.168.0.x to 192.168.1.x. Also, for VCU 313, the IP address for the external train VLAN has been NAT translated from 192.168.0.10 to 192.168.1.10.

At 460, the present embodiment exchanges routing information between routers for communication using the NAT translation addresses. As shown in FIG. 5C, the routers 310, 320, 330, and 340 exchange routing information through a routing protocol over the train wide VLAN 390. For example, in one embodiment, the routing protocol is a dynamic variable length subnet mask (VLSM) routing protocol, such as RIPv2, OSPF, or EIGRP. In this way, the routers know how to forward packets using the correct addressing.

For example, to communicate over the train wide VLAN 390 with devices on car 1, messages need to be sent through the subnetwork 192.168.1.x. Similarly, to communicate over the train wide VLAN 390 with devices on car 2, messages need to be sent through the subnetwork 192.168.2.x. Also, to communicate over the train wide VLAN 390 with devices on car 3, messages need to be sent through the subnetwork 192.168.3.x. Additionally, to communicate over the train wide VLAN 390 with devices on car 4, messages need to be sent through the subnetwork 192.168.4.x.

As an example, returning to FIG. 5B, and referring to Table 1, a message from VCU 313 in car 1 is sent to the VCU 333 in car 3. In the first step, the message is sent from the VCU 313 to the router 310 over the car VLAN 311. The router 310 will send the message over the train VLAN 390. As such, at the MAC level the destination MAC address is for the gateway router 310 on the car VLAN 311 and the source MAC address is that of the VCU 313. At this point, the source IP address is still 192.168.0.10 while the destination IP address has been translated to 192.168.3.10.

In the next step, the gateway router 310 will source a new frame and provide a NAT translation for the source IP address. That is, the message will be sent from the router 310 in car 1 to the router 330 in car 3 over the train VLAN 390. As such, at the MAC level the destination MAC address is that of router 330 and the source MAC address is that of router 310. However, the source IP address has been NAT translated to 192.168.1.10 and the destination address remains as 192.168.3.10.

In the next step, the message is received at router 330 at car 3. As such, the gateway router 330 will source a new frame and provide a NAT translation for the destination IP address. That is, the message will be sent from the router 330 in car 3 to the VCU 333 in car 3 over the car VLAN 331. As such, at the MAC level, the destination MAC address is that of VCU 333, and the source MAC address is that of router 330. The source IP address remains NAT translated to 192.168.1.10 and the destination address has been NAT translated to 192.168.0.10.

Figure 6:
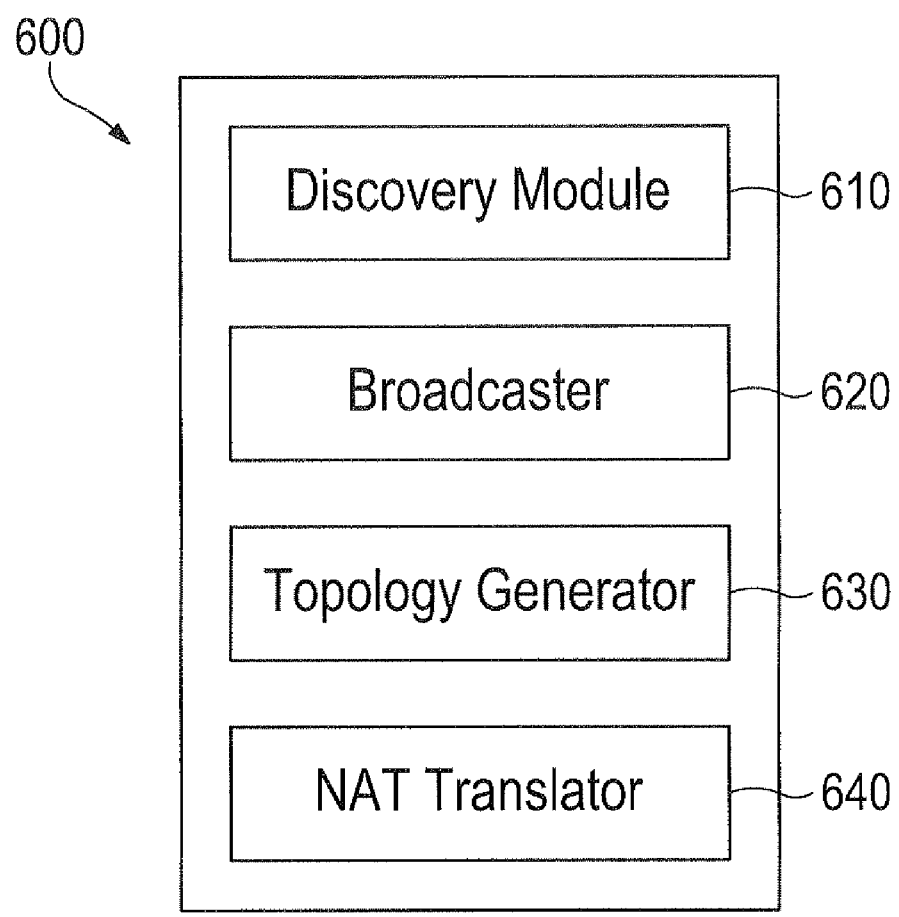
FIG. 6 is a block diagram illustrating a vehicle control unit that is capable of train inauguration over an IP based communication network, in accordance with one embodiment of the present invention.

FIG. 6 is a block diagram of a VCU 600 that is capable of train inauguration over an IP communication network, in accordance with one embodiment of the present invention. The VCU 600 can perform the functions of the VCUs in FIGS. 1, 2, 3, 4, and 5A-C for train inauguration.

The VCU includes a discovery module 610 for discovering network and configuration information for cars in a train. More specifically, the discovery module 610 discovers network and configuration information for cars in a unit of cars, wherein the train comprises a plurality of units. For instance, the discovery module 610 performs a discovery protocol on devices in the unit of cars to discover the network and configuration information over a unit-wide IP communication network. In addition, the discovery module 610 is able to discover network and configuration information for neighboring cars, as previously described.

The VCU 600 also includes a broadcaster 620 that is communicatively coupled to the discovery module 610. The broadcaster 620 broadcasts the network and configuration information to other units in the train over the train-wide IP communication network. In particular, the information is broadcast to other VCUs in the train.

The VCU 600 also includes a topology generator 630 that receives the network and configuration information for all the cars in the train. The topology generator 630 generates a car and unit topology for the train using the network configuration information and an identified leading car of the train as previously described. That is, since network and configuration information can be determined for each car and each unit, and neighboring information is also discovered for cars between units, an order of cars and units can be generated for the train.

The VCU 600 also includes a NAT translator for providing the necessary network and configuration information to respective routers in order for the routers to generate NAT translation addresses for fixed IP addresses of devices in the plurality of cars. NAT translation enables communication between devices in separate cars over a train-wide IP communication network and associated car IP communication networks.

In addition, the VCU 600 also includes a communication module. The communication module allows the VCU 600 to communicate with an associated router to determine the router topology throughout the train. In addition, the router enables communication over the train wide VLAN. Also, the communication module enables communication between a switch the VCU 600, and the associated router, and associated devices that are communicatively coupled on a car-wide Ethernet VLAN network.

In another embodiment, train inauguration is provided for units of trains that previously had been inaugurated. For instance, a unit of train is split off and combined with another train that has been inaugurated. In this case, IP addresses for unit wide VLANs may have been NAT translated. Basically, these NAT translated addresses are used during the re-inauguration of the new train.

First, when the new link is made between the two inaugurated units, the switches sense a new link up and send an SNMP trap to their respective VCUs through their management unit VLANs. The VCUs send out a command for the switches to discover information about devices in neighboring cars. The detailed information about the neighbors is then sent back to the VCU. This information can be used during the inauguration process as described in flow diagram 400 that follows. For example, static IP addresses can be used in the inauguration process.

In still another embodiment, train inauguration is provided for a train that is changing orientation. That is, a train that is traveling in one direction on a track is now reversing its direction. In general, the inauguration process starts from the beginning. That is, the process outlined in flow diagram 400 is performed to build a new car and unit topology and NAT table for addresses.

Accordingly, various embodiments of the present invention disclose a method and system for train inauguration over an Internet Protocol (IP) based communication network. Embodiments of the present invention provide for a single IP network communicatively coupling standard IP devices located throughout a train, instead of having many different physical networks inside the train controlling different control features. The IP network supports train inauguration and is compatible with legacy equipment coupled to the IP network through gateways.

While the methods of embodiments illustrated in flow chart 400 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

Embodiments of the present invention, a method and system for train inauguration over an IP based communication network are described. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

What is claimed is:

1. A method of train inauguration, comprising:
   identifying a leading car of a plurality of cars that form a train, wherein said train comprises a first unit including a first car and a second unit including a second car;
   discovering network and configuration information for said plurality of cars, wherein said first car is configured to communicate said network and configuration information to said second car via a first subnet of an Internet Protocol (IP) network;
   generating a Network Address Translation (NAT) table for fixed IP addresses of devices in said plurality of cars, wherein said devices comprise a first device and a second device including one or more of a door controller, a light controller, or a climate controller, wherein said first device in said first car shares the same fixed IP address as said second device in said second car, and wherein said NAT table identifies a unique IP address for each of said first and second devices; and
   communicating with one or more of said devices, wherein said unique IP address is used for communication between said second car and said first device via said first subnet, and wherein said fixed IP address is used for communication between said first car and said first device via a second subnet of said IP network.

2. The method of claim 1, further comprising:
   performing a network discovery protocol on said devices in said plurality of cars to identify said leading car, wherein said leading car provides a start to a train topology comprising said plurality of cars, and wherein said train topology identifies an order of said plurality of cars with respect to said leading car.

3. The method of claim 2, wherein said unique IP address comprises a media access control (MAC) address, and wherein said network discovery protocol comprises:
   matching said MAC address of said first device to said first car to identify a position of said first car with respect to said order of said plurality of cars in said train topology.

4. The method of claim 1, further comprising:
   broadcasting said network and configuration information over a third subnet of said IP network including a train-wide virtual local area network (VLAN) comprising said plurality of cars, wherein said network and configuration information is broadcast by each of said plurality of cars to MAC addresses associated with said devices.

5. The method of claim 1, wherein said unique IP address is used for communication between devices in separate units over a third subnet of said IP network including a train-wide virtual local area network (VLAN), and wherein said first, second, and third subnets are all configured to communicate over a single network comprising said IP network.

6. The method of claim 1, wherein said first unit further comprises said leading car, wherein said NAT table comprises a second fixed IP address associated with said first device, and wherein said second fixed address is used for communications between said leading car and said first device over a third subnet of said IP network.

7. The method of claim 6, wherein said first subnet includes a car-wide virtual local area network (VLAN), wherein said second subnet includes fixed IP address is associated with a unit-wide VLAN, and wherein said car-wide and unit-wide VLAN are both configured to communicate over a single physical network including said IP network.

8. A vehicle control unit (VCU) comprising:
   a discovery module for discovering network and configuration information for a plurality of cars of a train, wherein said train comprises a plurality of units, and wherein each of said plurality of units comprises one or more of said plurality of cars;
   a topology generator for receiving said network and configuration information for said plurality of cars from other train VCUs to generate a train topology identifying an order of said plurality of cars in relationship to an identified leading car of said train;
   a network address translation (NAT) translator for associating unique NAT addresses for fixed internet protocol (IP) addresses of devices in said plurality of cars to enable communication between said devices over an IP network, wherein said IP network comprises a train-wide subnet and a unit-wide subnet, wherein said devices comprise one or more of a door controller, a light controller, a brake controller, or a climate controller, and wherein each of said devices are associated with a unique NAT address and a fixed IP address; and
   a router configured to use said unique NAT addresses for communication between two or more of said devices located in separate units via said train-wide subnet, wherein said fixed IP addresses are used for communication between two or more of said devices located in one unit via said unit-wide subnet.

9. The vehicle control unit of claim 8, further comprising:
a broadcaster for broadcasting said network and configuration information to said unique NAT addresses over said train-wide subnet.

10. The vehicle control unit of claim 8, wherein said separate units comprise a first car located in a first unit and a second car located in a second unit, wherein said first unit is communicatively coupled to said second unit, and wherein said network and configuration information is received by said first car from said second car via said train-wide subnet.

11. The vehicle control unit of claim 10, wherein said train-wide subnet and said unit-wide subnet are both configured to communicate over a single physical network including said IP network.

12. The vehicle control unit of claim 10, further comprising:
a communication module for communicating said network and configuration information with an associated router in said second car to determine a routing topology of said train.

13. The vehicle control unit of claim 12, wherein said communication module enables communication between a switch in said vehicle control unit, said associated router, and associated devices communicatively coupled on said unit-wide subnet including an Ethernet virtual local area network (VLAN).

14. The vehicle control unit of claim 8, wherein said NAT translator further associates said unique NAT addresses with second fixed IP addresses of said devices, wherein each of said devices is associated with a second fixed IP address, and wherein said second fixed IP addresses are used for communication between two or more of said devices located in one car via a car-wide subnet of said IP network.

15. The vehicle control unit of claim 14, wherein each of said plurality of units comprises a device that shares a same fixed IP address including the second fixed IP address.

16. The vehicle control unit of claim 8, wherein said unique NAT address comprises a media access control (MAC) address.

17. The vehicle control unit of claim 10, wherein said order of said plurality of cars is identified according to which communication port is used to communicatively couple said first car with said second car.

18. The vehicle control unit of claim 10, wherein said first car is communicatively coupled to said second car via a first port, wherein said first car is communicatively coupled to a third car via a second port, and wherein said train topology identifies an order of said first, second, and third cars according to which of said first and second port is located at a front of the first car nearest said leading car.

19. A system comprising:
a processor; and
a computer readable memory having stored thereon computer executable instructions that, when executed by the processor, cause the system to perform operations comprising:
identifying a leading car of a plurality of cars that form a train, wherein said train comprises a plurality of units, and wherein each of said plurality of units comprises at least one car of said plurality of cars;
discovering network and configuration information for said plurality of cars;
generating car and unit topology of said train based on said network and configuration information and an orientation of said plurality of cars with respect to said leading car;
identifying fixed device addresses for said plurality of cars, wherein said plurality of cars is associated with an identical set of said fixed device addresses, wherein said fixed device addresses are used for communicating over a car-wide virtual local area network (VLAN), and wherein said car-wide VLAN is configured to provide for communication between devices located within a single car of said plurality of cars, wherein said devices comprise one or more of a door controller, a light controller, or a climate controller;
generating network address translation (NAT) addresses for said fixed device addresses;
and
communicating with devices located in separate units of said plurality of units over a train-wide VLAN using said NAT addresses, wherein both of said car-wide VLAN and said train-wide VLAN are configured to communicate over a single physical communication network of said train.

20. The system of claim 19, wherein said operations further comprise:
identifying second fixed Internet Protocol (IP) addresses of said devices, wherein each of said plurality of units is associated with an identical set of said second fixed IP addresses, and wherein said second fixed IP addresses are used for communicating over a unit-wide VLAN of said single physical communication network.

21. The system of claim 19, wherein said fixed device addresses comprise is a unique IP address in said car-wide VLAN, and wherein said NAT addresses comprise a unique device address in said train-wide VLAN to provide for independent control of any of said devices.

22. The system of claim 19, further comprising one or more routers configured to provide wireless communication between a plurality of VLANs within said train, wherein said one or more routers are further configured to provide wireless communication to external networks outside of said train using said NAT addresses.

23. A memory device having stored thereon computer executable instructions which, when executed by a processing system, causes the processing system to perform, operations comprising:
identifying a plurality of cars that form a train, wherein said train comprises a plurality of units, and wherein each of said plurality of units comprises at least one car of said plurality of cars;
discovering network and configuration information for said plurality of cars;
generating car and unit topology of said train based on said network and configuration information;
identifying fixed internet protocol (IP) addresses address of devices in said plurality of cars, wherein said devices comprise one or more of a door controller, a light controller, a brake controller, or a climate controller, wherein each of said plurality of cars is associated with an identical set of said fixed IP addresses for said devices, and wherein said fixed IP addresses are used for communicating between two or more devices located in a single unit of said plurality of units; and
associating network address translation (NAT) addresses for said fixed IP addresses, wherein said NAT addresses are used for communicating between devices located in different units of said plurality of units.

24. The memory device of claim 23, wherein said fixed IP addresses are used for communicating via a unit-wide subnet of an IP network, wherein said NAT addresses are used for communicating via a train-wide subnet of said IP network to independently control one or more of said devices, and wherein said IP network comprises a single physical communication network of said train.

* * * * *

UNITED STATES PATENT AND TRADEMARK OFFICE
CERTIFICATE OF CORRECTION

PATENT NO.        : 8,037,204 B2
APPLICATION NO.   : 11/056545
DATED             : October 11, 2011
INVENTOR(S)       : Luc Breton It is certified that error appears in the above-identified patent and that said Letters Patent is hereby corrected as shown below:

Column 12, line 41, CLAIM 7, after "includes" delete "fixed IP address is associated with".

Column 12, line 64, CLAIM 8, after "wherein" delete "each of".

Column 14, line 33, CLAIM 21, after "comprise" delete "is".

Column 14, line 45, CLAIM 23, after "to" delete "perform," and insert -- perform --.

Column 14, line 55, CLAIM 23, after "addresses" delete "address".

Signed and Sealed this
Twenty-fourth Day of April, 2012

David J. Kappos
*Director of the United States Patent and Trademark Office*